(12) United States Patent
Cotton (10) Patent No.: US 8,370,241 B1
(45) Date of Patent: Feb. 5, 2013

(54) SYSTEMS AND METHODS FOR ANALYZING FINANCIAL MODELS WITH PROBABILISTIC NETWORKS

(75) Inventor: Peter D Cotton, New York, NY (US)

(73) Assignee: Morgan Stanley, New York, NY (US)

( * ) Notice: Subject to any disclaimer, the term of this patent is extended or adjusted under 35 U.S.C. 154(b) by 1692 days.

(21) Appl. No.: 10/994,832

(22) Filed: Nov. 22, 2004

(51) Int. Cl.
*G06Q 40/00* (2006.01)
(52) U.S. Cl. .................................. 705/36 R; 705/35
(58) Field of Classification Search ............... 705/35, 705/36 R
See application file for complete search history.

(56) References Cited

U.S. PATENT DOCUMENTS

| | | | |
|---|---|---|---|
| 6,021,397 A | 2/2000 | Jones et al. | |
| 7,024,388 B2 | 4/2006 | Stefek et al. | |
| 7,536,329 B2* | 5/2009 | Goldberg et al. | 705/35 |
| 7,571,140 B2 | 8/2009 | Weichert et al. | |
| 7,698,213 B2 | 4/2010 | Lancaster | |
| 7,788,192 B2 | 8/2010 | Amin | |
| 7,792,730 B2 | 9/2010 | Kastel et al. | |
| 7,870,052 B1 | 1/2011 | Goldberg et al. | |
| 8,131,635 B2 | 3/2012 | Gagnon et al. | |
| 2001/0042785 A1 | 11/2001 | Walker et al. | |
| 2002/0128943 A1* | 9/2002 | Schreckengast et al. | 705/36 |
| 2003/0061152 A1 | 3/2003 | De et al. | |
| 2003/0149657 A1* | 8/2003 | Reynolds et al. | 705/38 |
| 2003/0195831 A1 | 10/2003 | Feldman | |
| 2004/0054572 A1* | 3/2004 | Oldale et al. | 705/10 |
| 2004/0225598 A1* | 11/2004 | Goldberg et al. | 705/38 |
| 2005/0096950 A1* | 5/2005 | Caplan et al. | 705/7 |
| 2005/0209959 A1* | 9/2005 | Tenney | 705/39 |
| 2005/0234792 A1 | 10/2005 | Gagnon et al. | |
| 2006/0143099 A1 | 6/2006 | Partlow et al. | |
| 2007/0244785 A1 | 10/2007 | Williams | |
| 2008/0235222 A1 | 9/2008 | Mojsilovic | |

OTHER PUBLICATIONS

Giesecke, Kay. "Correlated default with incomplete inforamtion". Journal of Banking & Finance. vol. 28, Issue 7, Jul. 2004. (37 pages from ProQuest).*
Duffie, D. and J. Pan, "An Overview of Value at Risk". The Journal of Derivatives, Spring 1997.
Merton, "On the Pricing of Corporate Debt: The Risk Structure of Interest Rates", Journal of Finance, 29:449-470 (1974).
Black et al., "Valuing Corporate Securities: Some Effects of Bond Indenture Provisions", Journal of Finance, 31:351-367 (1976).
Longstaff et al., "A Simple Approach to Valuing Risky Fixed and Floating Rate Debt", Journal of Finance, 50(3):789-819 (1995).
Leland, "Corporate Debt Value, Bond Covenants and Optimal Capital Structure", Journal of Finance, 49(4):1213-1252 (1994).
Giesecke et al., "Forecasting Default in the Face of Uncertainty", Journal of Derivatives, 12(1):1-15 (2004).
Eom et al., "Structural Models of Corporate Bond Pricing: An Empirical Analysis", Review of Financial Studies, 17:499-544 (2004).

(Continued)

*Primary Examiner* — Hani M Kazimi
(74) *Attorney, Agent, or Firm* — K&L Gates LLP (57) ABSTRACT

A computer-assisted method for evaluating a financial model. The method may include selecting a financial model describing a distribution of a first financial variable and representing the financial model in a probabilistic network. The model may also include deriving a refined financial model based on the probabilistic network and finding a value of a financial instrument based at least in part on the refined financial model. A property of the financial instrument may be described by the first financial variable. In various embodiments, the method may also include inferring a value of the first financial variable.

6 Claims, 8 Drawing Sheets

OTHER PUBLICATIONS

Bertsimas, D., Lauprete, G.J. and A. Samarov, "Shortfall as a Risk Measure: Properties, Optimization and Application". Journal of Economic Dynamic & Control, 28 (2004), 1353-1381.

Danielsson, J., de Hann, L., Peng, L. and C. G. de Vries, "Using a Bootstrap Method to Choose the Sample Fraction in Tail Index Estimation". Econometric Institute Report El 2000-19/A.

Duffile, D. and J. Pan, "An Overview of Value at Risk". The Journal of Derivatives, Spring 1997.

Fernandez, V., "Extreme Value Theory and Value at Risk", Revista de Análisis Económico, vol. 18, No. .1, pp. 57-83 (2003).

Heyde, C.C. and Kou, S. G., "On the Controversy Over Tailweight of Distributions". Operations Research Letters 32 (2004), pp. 399-408.

McNeil, A. and Frey, R. (2000). "Estimation of Tail-Related Risk Measures for Heteroscedastic Financial Series: An Extreme Value Approach". Journal of Empirical Finance, 7 (3-4), pp. 271-300.

Niederhausen, H., "Scheffer Polynomials for Computing Exact Kolomogrov-Smirnov and Rényi Type Distributions". The Annals of Statistics, vol. 9, No. 5 (1981), pp. 923-944.

Chakravarti, Laha and Roy (1967), Handbook of Methods of Applied Statistics, vol. I, John Wiley and Sons, pp. 392-411, Chapter 8.

U.S. Appl. No. 11/825,718, filed Jul. 9, 2007.

U.S. Appl. No. 11/355,160, filed Feb. 14, 2006.

U.S. Appl. No. 11/789,318, filed Apr. 24, 2007.

U.S. Appl. No. 11/581,501, filed Oct. 16, 2006.

Murphy, Kevin, "*A Brief Introduction to Graphical Models and Bayesian Networks*", dated 1998, Webpage accessed from http://www.ai.mit.edu/~murphyk/Bayes/bayes.html, Nov. 1, 2004.

Li, David X., "*On Default Correlation: A Copula Function Approach*", dated Apr. 2000, Webpage accessed from http://defaultrisk.com/pp_corr_05.htm, Mar. 4, 2005.

Hull, John, and White, Alan, "*The Valuation of Credit Default Swap Options*", dated Jan. 2003, Webpage accessed from http://defaultrisk.com/pp_crdrv_27.htm, Mar. 4, 2005.

"*Bayes's Theorem*" dated Jun. 28, 2003, Webpage accessed from http://plato.stanford.edu/entries/bayes-theorem/, Sep. 22, 2003.

Garcia, João; Gielens, Geert; Leonard, Luc; and Van Gestel, Tony, "*Pricing Baskets Using Gaussian Copula and BET Methodology: a Market Test*", dated Jun. 23, 2003, Webpage accessed from http://defaultrisk.com/pp_crdrv_35.htm, Mar. 4, 2005.

Yu, Fan, "*Correlated Defaults and the Valuation of Defaultable Securities*", dated May 2004, Webpage accessed from http://www.moodyskmv.com/conf04/pdf/presentations/yu_corr_def_and_val.pdf, Feb. 24, 2005.

Giesecke, Kay and Goldberg, Lisa R., "*The Market Price of Credit Risk*", dated Sep. 23, 2003, revised Sep. 23, 2004.

Giesecke, Kay, "*Credit Risk Modeling and Valuation: An Introduction*", dated Oct. 24, 2004, Webpage accessed from http://defaultrisk.com/pp_model_38.htm, Mar. 4, 2005.

Malevergne, Yannick and Somette, Didier "*Testing the Gaussian Copula Hypothesis for Financial Assets Dependences*", Webpage accessed from http://www.papers.ssrn.com/sol3/papers.cfm?abstract_id=291140I, Mar. 7, 2005.

Anonymous "Insightful Expands Operations on Wall Street; Leading Analytics Provider Facilitates Continued Growth in Financial Services", Jun. 4, 2001, Business Wire.

Anonymous "Products & services (2005 guide to computerized trading)(Directory)", Jun. 15, 2005, Futures (Cedar Falls, Iowa), 34, 8, 44(33).

Veres, Bob "Beyond the Pyramid: Think you know the state of the art in portfolio management? New research may offer some surprises—and suggest new approaches." Financial Planning, Mar. 1, 2006.

Albanese et al. "A New Fourier Transform Algorithm for Value-At-Risk", Mar. 4, 2004, Institute of Physics Publishing, Quantitative Finance, vol. 4 (2004) 328-338.

Goldberg et al. "Beyond Value at Risk: Forecasting Portfolio Loss at Multiple Horizons", 2008, Journal of Investment Management, vol. 6, No. 2, pp. 73-98.

Office Action issued on Oct. 6, 2011 in U.S. Appl. No. 11/825,718.

Office Action issued on May 24, 2012 in U.S. Appl. No. 11/825,718.

Office Action issued on Mar. 30, 2010 in U.S. Appl. No. 11/789,318.

Notice of Allowance issued on Sep. 3, 2010 in U.S. Appl. No. 11/789,318.

Office Action issued on Oct. 10, 2012 in U.S. Appl. No. 11/825,718.

\* cited by examiner

SYSTEMS AND METHODS FOR ANALYZING FINANCIAL MODELS WITH PROBABILISTIC NETWORKS

BACKGROUND

Participants in the financial services industry utilize financial models or mathematical descriptions of the values of one or more financial variables under various market conditions. For example, credit models, such as various copula credit models, are used to describe the default probability of debt instruments based on market conditions such as spreads, whether other debt instruments have defaulted, etc. Many of these credit models take into account the relationships between the default probabilities of various debt instruments. Credit models may be used to value debt instruments themselves or credit derivative instruments based on underlying debt instruments. For example, credit models may be used to value the tranches of a collateralized debt obligation (CDO) or a credit swap. Other examples of financial models may include the Black-Scholes Model for describing the value of an option contract based on market conditions including the price of the underlying security, the strike price, etc.

Often existing financial models include implicit assumptions about the market and the relationships between the modeled financial variables. The consequences, and sometimes the existence, of these implicit assumptions in a financial model may not be immediately apparent to the modeler. It can be appreciated that if a financial model includes implicit assumptions that are absurd or do not match actual market conditions, the value of the model may be limited.

Also, existing financial models often require complex computations to find conditional distributions of financial variables, e.g. the distribution of a financial variable considering the known values of other financial variables. This can make it difficult to incorporate real-time data into a financial model. For example, correlation between the default probabilities of the underlying debt instruments of a collateralized debt obligation (CDO) may affect the values of the various tranches if some of the underlying debt instruments default. In fact, if the default probabilities of the underlying debt instruments show a high degree of correlation, then the value of higher tranches of the CDO may suffer even if there are just a few defaults.

What is needed are improved systems and methods for extracting the implications of financial models and a framework for using and improving the models. What is also needed are methods and systems for considering conditional probabilities of financial variables in financial models.

SUMMARY

In one embodiment, the present invention is directed to a computer-assisted method for evaluating a financial model. The method may include selecting a financial model describing a distribution of a first financial variable and representing the financial model in a probabilistic network. The model may also include deriving a refined financial model based on the probabilistic network and finding a value of a financial instrument based at least in part on the refined financial model. A property of the financial instrument may be described by the first financial variable.

In one embodiment, the present invention is directed to a computer-assisted method for evaluating a model of financial variables. The method may comprise selecting a financial model describing a plurality of financial variables. At least one of the plurality of financial variables may represent the default probability of a debt instrument. Also, a relationship between first and second financial variables described by the financial model may be affected by a third random variable. The method may also include representing the financial model in a probabilistic network. The first financial variable may be represented by a first node of the probabilistic network and the third random variable may represented by a second node of the probabilistic network. The method may also include deriving a refined financial model based on the probabilistic network and finding a value of the debt instrument based at least in part on the refined financial model.

In one embodiment, the present invention is directed to a computer assisted method for modeling financial variables in a probabilistic network. The probabilistic network may include a first node corresponding to a first financial variable, a second node corresponding to a second financial variable and a third node corresponding to a third random variable. The third random variable may affect a dependency between the first financial variable and the second financial variable. The method may include representing a known value of the first financial variable as evidence in the probabilistic network, inferring a value of the third random variable using the probabilistic network and inferring a value of the second financial variable considering the value of the third random variable. The method may also include finding a value of a financial instrument based at least in part on the probabilistic network, wherein a property of the financial instrument is described by the second financial variable.

BRIEF DESCRIPTION OF THE DRAWINGS

Further advantages of the present invention may be better understood by referring to the following description taken in conjunction with the accompanying drawings, in which.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

As used herein, the term "financial variable" may mean a random variable describing one or more properties of a financial instrument, such as a security, or a derivative thereof. In various embodiments, financial variables may be random variables describing the probability that the financial instrument will have a particular property. Examples of financial variables may include the default probability of a debt instrument, the spread of a debt instrument or other security, the market value of a security or derivative, etc.

As used herein, the term "default" may mean a failure or inability of an issuer to honor a debt obligation or instrument.

As used herein, the term "financial instrument" may mean a security or other investment instrument including derivatives thereof.

As used herein, the term "financial model" may mean a model of one or more financial variables.

As used herein, the term "credit model" may mean a financial model where one or more modeled financial variables include a financial variable describing a debt instrument or derivative thereof. Examples of such financial variables may include the probability or risk neutral probability of default, factors affecting or potentially affecting said probability of default, dependence between defaults, etc.

As used herein, the term "probabilistic network" may mean any representation of a set of random variables wherein the random variables are defined in terms of the dependence relationships among the set. Probabilistic networks may include both directed and undirected probabilistic networks. Undirected probabilistic networks may include, for example, Markov Random Fields, Markov networks, etc. Directed probabilistic networks may include Bayesian networks, belief networks, etc.

Figure 1:
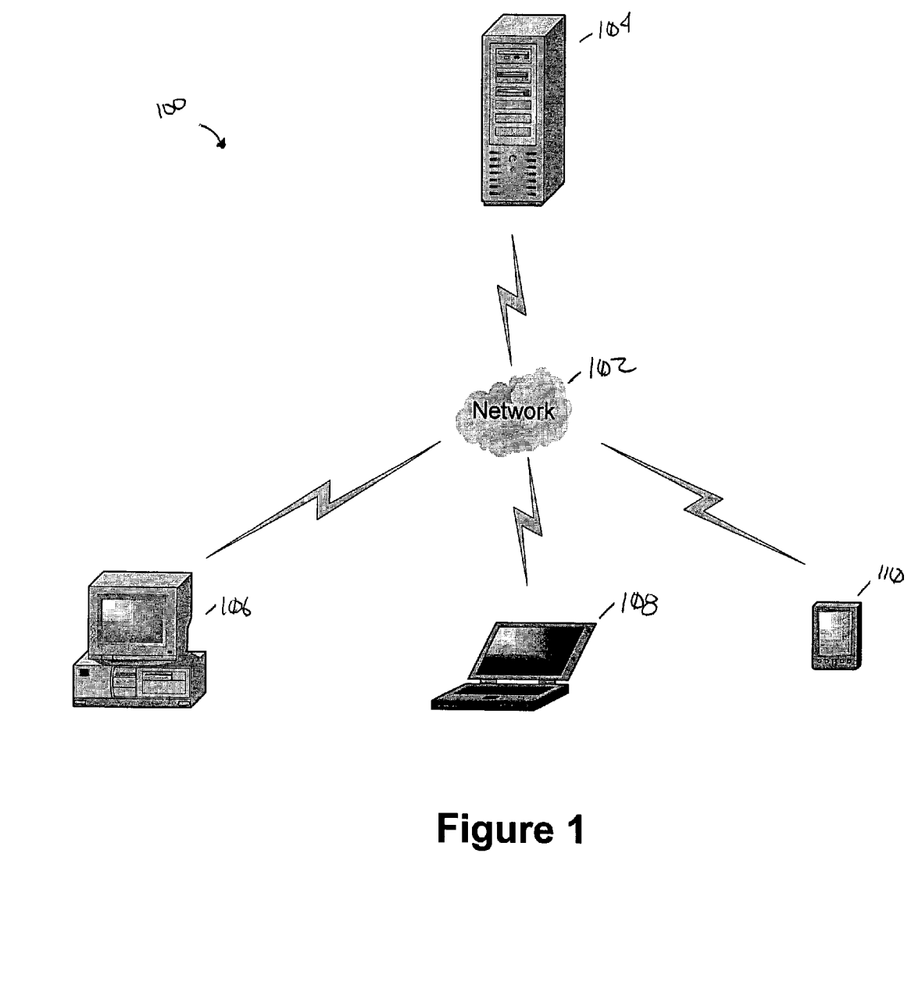
FIG. 1 is a diagram illustrating a computer system according to various embodiments.

FIG. 1 shows a computer system 100 that may be used to implement various embodiments of the present invention. The computer system 100 may include various computing devices including a server 104, a personal computer 106, a laptop 108, and a handheld computer 110. Computing devices 104, 106, 108, 110 may be operatively connected through network 102. In various embodiments, the computer system 100 may include more devices than are shown in FIG. 1 including, for example, multiple examples of the devices 104, 106, 108, 110. A user of the computer system 100 may use any of devices 106, 108, 110 to enter financial model information, and to receive results of the present systems and methods. Users may include, for example, traders, risk managers, model review personnel, etc. In various embodiments, the processing necessary for implementing embodiments of the present systems and methods may be performed at devices 106, 108, 110, or in other embodiments, may be performed by one or more servers 104 communicating with devices 106, 108, 110 via network 102.

Figure 2:
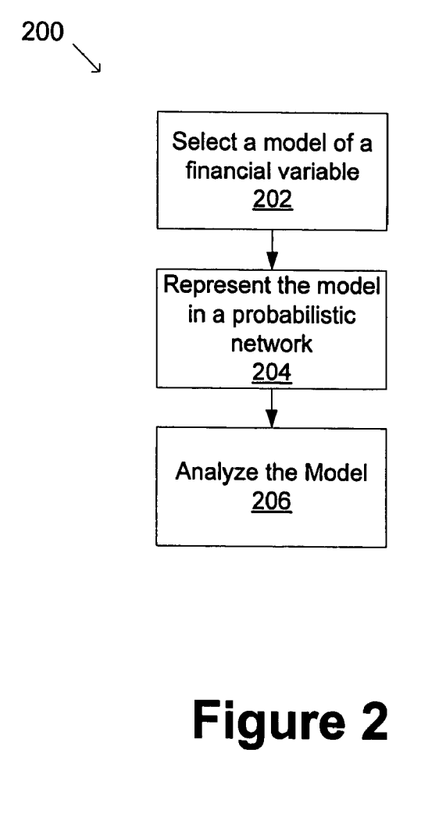
FIG. 2 is a flowchart illustrating the process flow of a method according to various embodiments.

FIG. 2 shows a flowchart of a process flow 200 for analyzing a financial model describing a set of financial variables according to various embodiments. Step 202 may include selecting a financial model. The chosen model may be any model of a financial variable. In various embodiments, the financial model may be derived specifically for a particular application, or may be a known model, such as, for example, the Black-Scholes model for option pricing or a copula credit model for credit derivative default modeling, such as the normal or Gaussian copula credit model discussed in more detail below.

Various embodiments may include deriving a financial model. For example, a copula credit model may be derived as follows. First, a marginal distribution may be derived for the financial variables describing the default probabilities of each debt instrument in a set of debt instruments to be modeled. The marginal distributions may be derived according to a number of approaches. A historical approach may involve examining past default information on similar debt instruments. A Merton option approach may include deriving distributions based on the equity of the issuing entity. Also, an implied approach may involve deriving distributions based on market prices of similar debt instruments.

Once derived, the marginal distributions may be expressed in several ways. For example, the marginal distribution may be expressed as a hazard rate function describing the probability of default at various times, T; a survival distribution describing the probability that the debt instrument survived from time zero to various times, T; or a time to default distribution describing the probability that the debt instrument has defaulted between time zero and various times, T.

A joint distribution incorporating the marginal distributions of each debt instrument in the set may be found using any suitable copula function. For example, the Gaussian or normal copula may be used as shown in Equation 1 below:

$$C_\Sigma(u_1,\ldots,u_n)=\Phi_\Sigma^n(\Phi^{-1}(u_1),\ldots,\Phi^{-1}(u_n)) \quad (1)$$

where $\Phi$ is the standard normal distribution, $\Sigma$ represents a matrix of correlation values between the marginal distributions of the debt instruments, $\Phi^{-1}$ is the inverse standard normal distribution function, and $u_i$ are the random variables whose marginal distributions are joined.

In various embodiments, latent factor variables may be explicitly incorporated into financial models. These latent factor variables may represent the relationships between one or more financial variables and may be based on other observable or unobservable quantities affecting the financial model. In various embodiments, latent factor variables may be expressed as a set of conditions under which two or more otherwise conditionally dependent random variables may be conditionally independent. Latent factor variables may, in various embodiments, be derived from the financial model.

Latent factor variables in various embodiments may fall into several categories. Some latent factor variables may describe regimes under which a financial model may behave differently. Examples of these regime-switching latent factor variables may include, for example, an interest rate, or the state of default on a financial instrument. Other latent factor variables may describe different economic conditions under which a financial model behaves differently, for example, rates of inflation or Gross Domestic Product (GDP). Still other latent factor variables may model the effects of statistical error, for example, measurement errors, statistical noise, etc.

Figure 4:
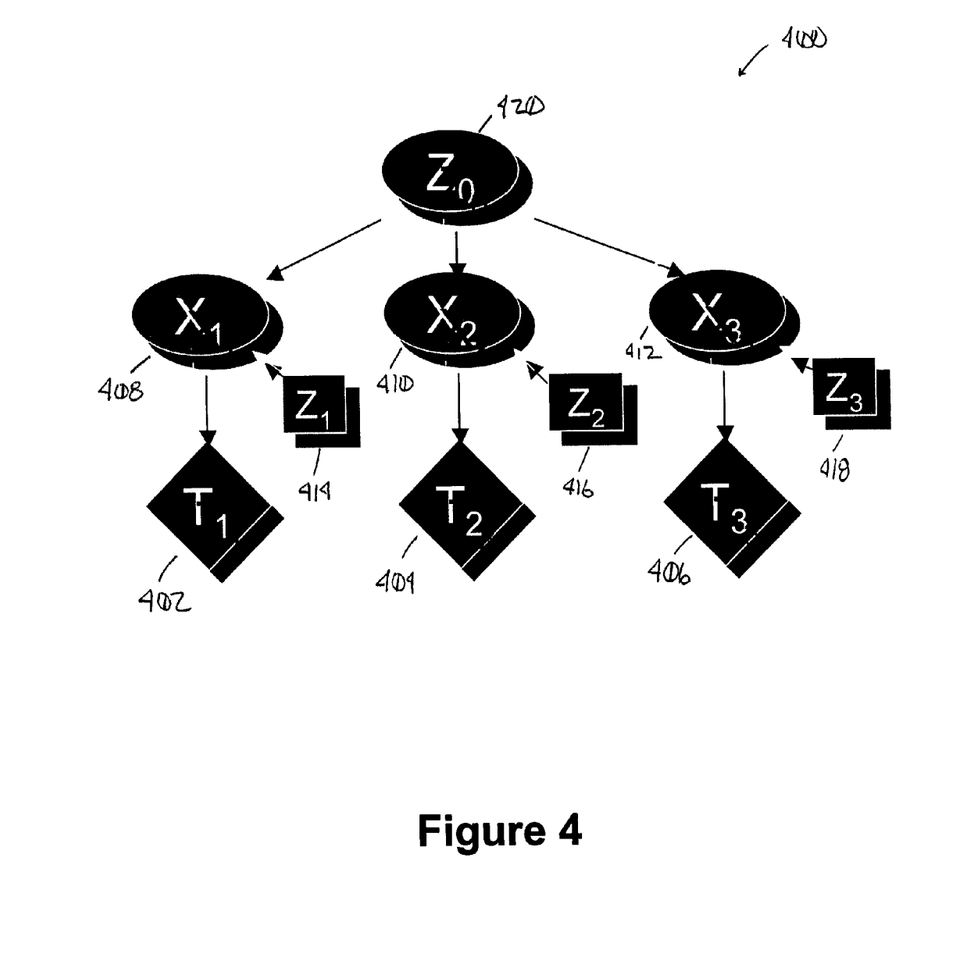
FIG. 4 is a diagram illustrating a probabilistic network according to various embodiments.
Figure 7:
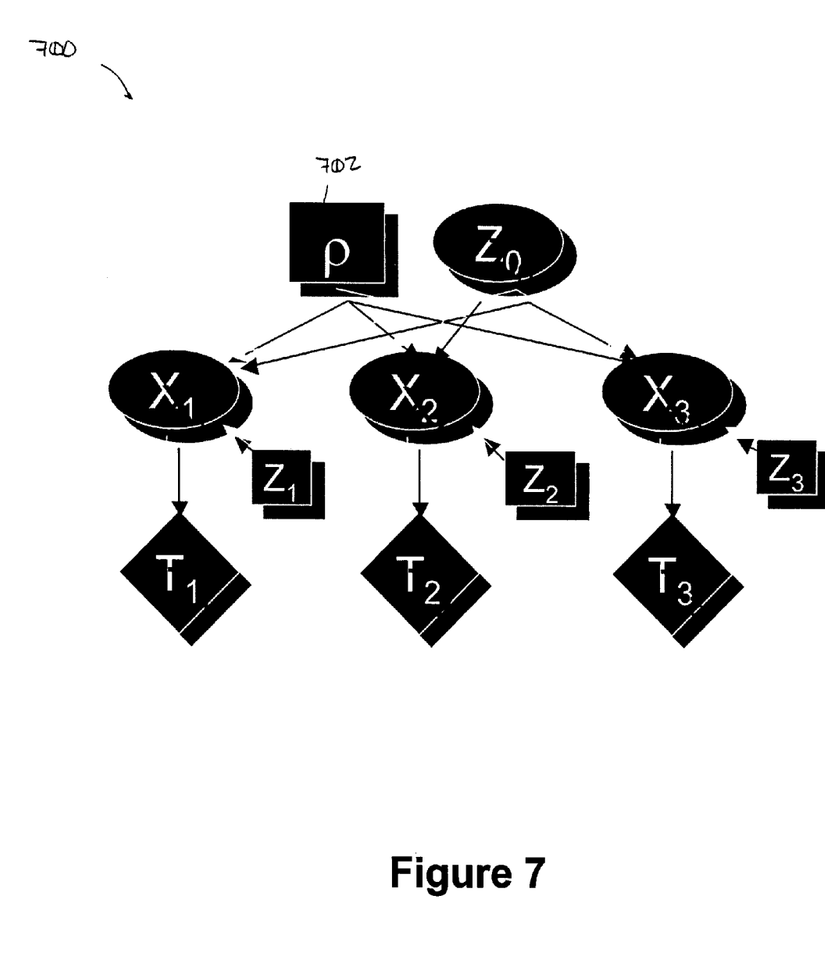
FIG. 7 is a diagram illustrating a probabilistic network according to various embodiments.
Figure 8:
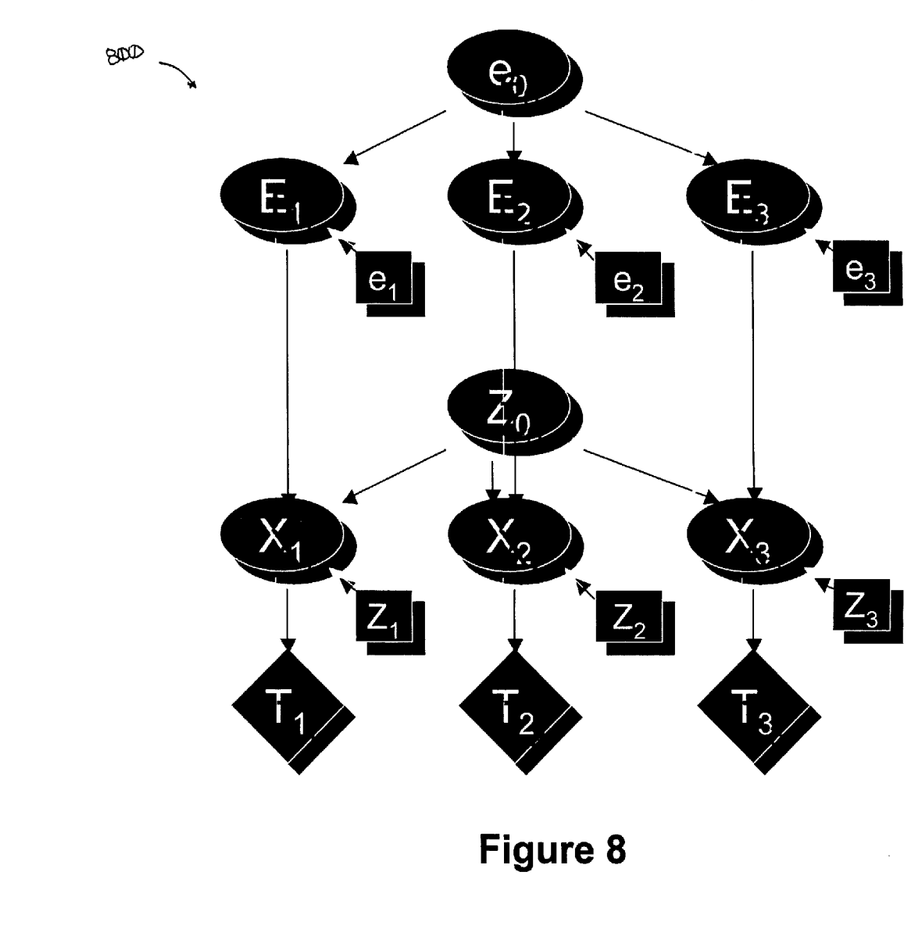
FIG. 8 is a diagram illustrating a probabilistic network according to various embodiments.

At step 204, the selected financial model may be represented as a probabilistic network. According to various embodiments, the probabilistic network may be a Bayesian network, however, it is envisioned that other probabilistic networks such as Markov networks, etc. are within the scope of various embodiments of the invention. In embodiments using a Bayesian network, each random variable, including, for example, financial variables and latent factor variables, may be assigned unique nodes. Arrows between nodes may represent dependencies where an arrow points from a parent node to a child node that depends on the parent. The lack of an arrow between two nodes represents an assumption that the two nodes are conditionally independent (e.g. changes in the value of one node's corresponding random variable do not affect the corresponding random variables of other unrelated nodes). Each node of the Bayesian network may have an associated function, or distribution, expressing the node's associated random variable in terms of the variables associated with its direct parent nodes. Examples of representations of financial models in Bayesian networks are shown in FIGS. 4, 7 & 8.

At step 206, the financial model may be analyzed using the probabilistic network representation derived at step 204. Analyzing the financial model may include, for example, examining the implicit assumptions of the model as well as refining the model by extending and/or generalizing it. Examining the explicit assumptions of a model may include visualizing the dependencies between variables shown by the various nodes of the probabilistic network. Examining explicit assumptions may also include calculating the response of the financial model to various market scenarios, for example, by entering evidence into the various nodes and inferring the resulting distributions of variables corresponding to other nodes.

Extending and/or generalizing the model may include finding ways to improve the model, for example, by considering the influence of another financial variable or latent factor variable. Also, basic assumptions of the model may be incorporated into the probabilistic network. For example, a financial model based on a Gaussian copula, as shown in Equation 1 above, considers the correlation matrix E, which must be separately derived or estimated. A probabilistic network representation may allow E to be included in the financial model as a node and corresponding variable, creating a more general financial model and providing a more accurate gauge of the model's results.

Figure 3:
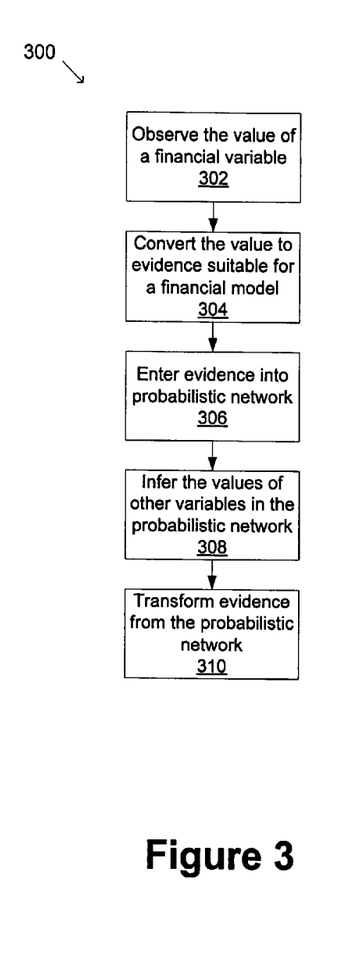
FIG. 3 is a flowchart illustrating the process flow of a method according to various embodiments.

As discussed above, another benefit of using a probabilistic network representation of a financial model may be greater ease in considering conditional probabilities when inferring distributions of financial variables. FIG. 3 shows a flowchart of a process flow 300 for inferring the distributions of financial variables using a financial model according to various embodiments of the present invention. Step 302 may involve observing the value of at least one financial variable, for example, the default time, spread, etc. of a financial instrument. At step 304, the observed value or values of financial variables may be converted to evidence suitable for entry into the model. For example, some models may consider only normalized values for variables as evidence.

The evidence may be entered into the financial model at step 306. Entering evidence into the financial model may involve setting the values of variables in the financial model to the observed value represented by the evidence. At step 308, the values of other variables in the financial model may be inferred considering the newly entered evidence. For example, the equations representing the variables of each node may be recalculated considering the evidence entered at step 306.

In various embodiments, calculations for inferring may be performed according to various numerical and/or analytical methods. For example, calculations may be performed according to a naïve sampling method and/or a Markov Chain Monte Carlo method. At step 310, the inferred values of financial variables in the financial model may be converted into real-world values. For example, if the observed values were standardized at step 304, then the resulting values may need to be de-standardized at step 310.

An example embodiment of the present invention is described below in conjunction with FIGS. 4-8. The example financial model may be a Gaussian or normal copula model incorporating latent factor variables $Z_i$. The financial variables modeled may be the default probabilities of three debt instruments, referred to as instruments 1, 2 and 3. It will be appreciated that the present methods may be implemented with other financial models and may model different numbers and different types of financial variables.

In various embodiments, the example financial model may be represented in a probabilistic network as shown by network 400 of FIG. 4. In the present example, the probabilistic network 400 is modeled as a Bayesian network allowing Bayesian assumptions to be made about the relationships between the nodes. It is envisioned, however, that other probabilistic networks may be used as well. Each node of the network 400 may correspond to a random variable describing instruments 1, 2 and 3. Some nodes may correspond to financial variables, latent factor variables, etc.

According to the Bayesian assumptions, the distribution of each random variable in the network 400 may be expressed as a function in terms of the random variables corresponding to the variable's parent node. Therefore, the dependence and/or correlation between a random variable and all of the other random variables in the network 400 may be expressed exclusively in terms of the random variables corresponding to parent nodes of the first random variable.

In the network 400, nodes 402, 404 and 406 correspond to random variables $T_1$, $T_2$ and $T_3$, which may be financial variables representing the default times of instruments 1, 2 and 3. The actual default times, $T_1$, $T_2$ and $T_3$, may be converted to standardized default times represented by random variables $X_1$, $X_2$ and $X_3$. It can be seen from network 400 that actual default times $T_1$, $T_2$ and $T_3$ (nodes 402, 404 and 406) depend from standardized default times $X_1$, $X_2$ and $X_3$ (nodes 408, 410 and 412). Therefore, according to Bayesian assumptions, $T_1$, $T_2$ and $T_3$ may be expressed in terms of $X_1$, $X_2$ and $X_3$. In this example model, the expression may be as follows:

$$F_{T_i}(t) = \Phi(X_i) \quad (2)$$

where $\Phi$ is the standard normal distribution and $F_{T_i}(t)$ is the marginal distribution of the default times of instruments 1, 2 and 3. Solving for $X_i$, Equation (2) yields the following expression:

$$X_i = \Phi^{-1}(F_{T_i}(t)) \quad (3)$$

Similarly, Bayesian assumptions may allow $X_1$, $X_2$ and $X_3$ to be expressed in terms of latent factor variables $Z_0$, $Z_1$, $Z_2$ and $Z_3$ corresponding to nodes 414, 416, 418 and 420. According to the Gaussian copula credit model of the current example, the distributions of $X_1$, $X_2$ and $X_3$ may be expressed in terms of $Z_0$, $Z_1$, $Z_2$ and $Z_3$ as shown:

$$X_i = Z_0\sqrt{\rho} + Z_i\sqrt{1-\rho} \quad (4)$$

where:

$$\rho = Cov(X_i, X_j) \quad (5)$$

The distributions of parent nodes 414, 416, 418 and 420 corresponding to latent factor variables $Z_i$ may be expressed, again according to the underlying financial model (here the Gaussian copula credit model). According to the model:

$$Z_i \sim N(0,1), i.i.d. \quad (6)$$

According to various embodiments, the financial model represented by probabilistic network 400 may be analyzed. For example, the network 400 may allow a modeler to graphically see the dependencies between various random variables in the model. Also, the network 400 may allow the financial model to be generalized and improved. For example, a node 702 may be added to represent the correlation coeffecient p as shown by network 700 in FIG. 7. Also, estimation error may be incorporated into the financial model as shown by network 800 in FIG. 8.

The financial model represented by probabilistic network 400 may also be used to simulate financial scenarios and predict the distributions of unknown random variables. For example, assume a financial scenario where instruments 1, 2 and 3 issued at a time zero, 3.5 years ago. Also, assume that instrument 3 defaulted in year 2, and that instruments 1 and 2 have not yet defaulted. Mathematically then, $T_1 > 3.5$, $T_2 > 3.5$, and $T_3 = 2$. Accordingly, simulating this scenario may include finding conditional distributions for $T_1$ and $T_2$, or finding $f(T_1|T_1>3.5, T_2>3.5, T_3=2)$ and $f(T_2|T_1<3.5, T_2>3.5, T_3=2)$.

In various embodiments, the first step of simulating a financial scenario may be to convert the observed values into evidence by standardizing the observed default times as described by Equations 2 and 3 above. Accordingly, $X_1>0$, $X_2>0$, and $X_3=-0.44$. Considering these values in Equations 4 and 5 above may lead to conditional distributions for $X_1$ and $X_2$ which may in turn lead to the desired conditional distributions for $T_1$ and $T_2$. Because of Bayesian assumptions, the final distributions of $T_1$ and $T_2$ reflect the relationships between $T_1$, $T_2$ and $T_3$ through their ultimate dependence on latent factor variable $Z_i$.

In various embodiments, calculations necessary to find the values for $X_i$ described above may be performed by probabilistic network modeling software. For example, various embodiments may use a Bayesian network software package such as Kevin Murphy's Bayesian Network Toolbox for Matlab (BNT), available at www.ai.mit.edu/~murphyk/Software/BNT/bnt.html. Certain software packages, such as BNT, may create additional difficulty because they do not accept inequality evidence. This may be overcome using a sequential update method where latent factor, and other variables from parent nodes are updated one condition at a time. For example, in the present exemplary model and scenario, latent factor variable $Z_o$ may first be updated to reflect the inequality condition $X_2>0$ outside of the software package. The updated distribution for $Z_o$ may then be entered into the software package along with equality evidence $X_3=-0.44$. The software package may then update the predicted distributions of $X_1$ and $X_2$. The condition $X_1>0$ may be considered by "chopping off the tail" of the resulting conditional distribution of $X_1$ or by merely not considering distributed values less than zero.

Figure 5:
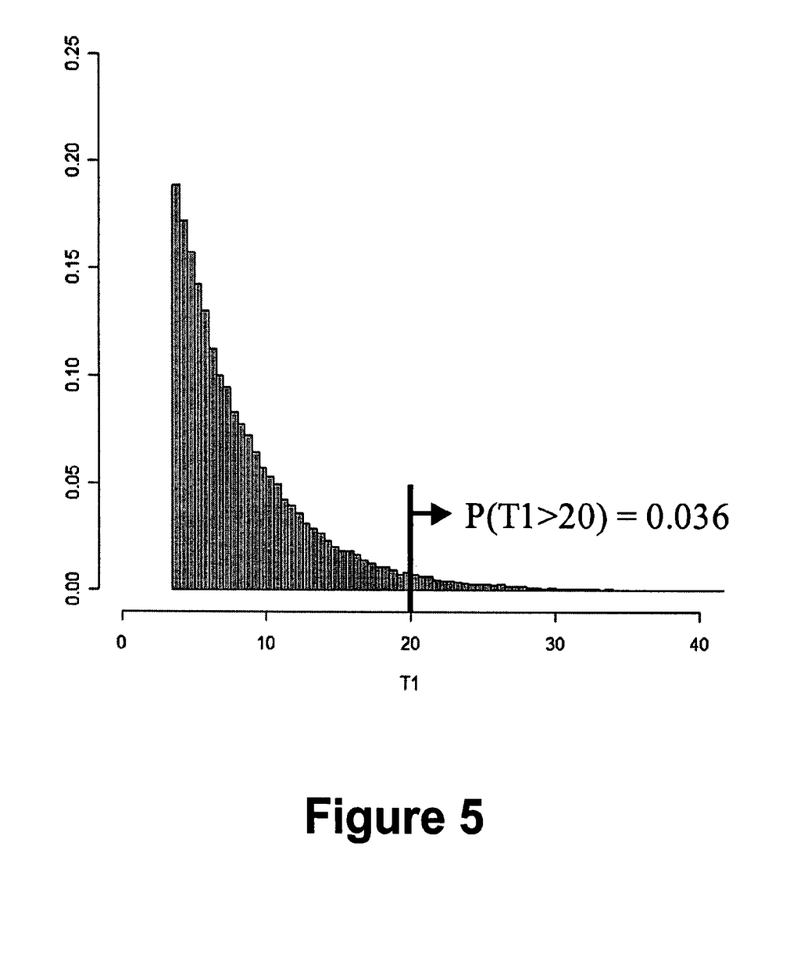
FIG. 5 is a chart showing results of a method according to various embodiments.
Figure 6:
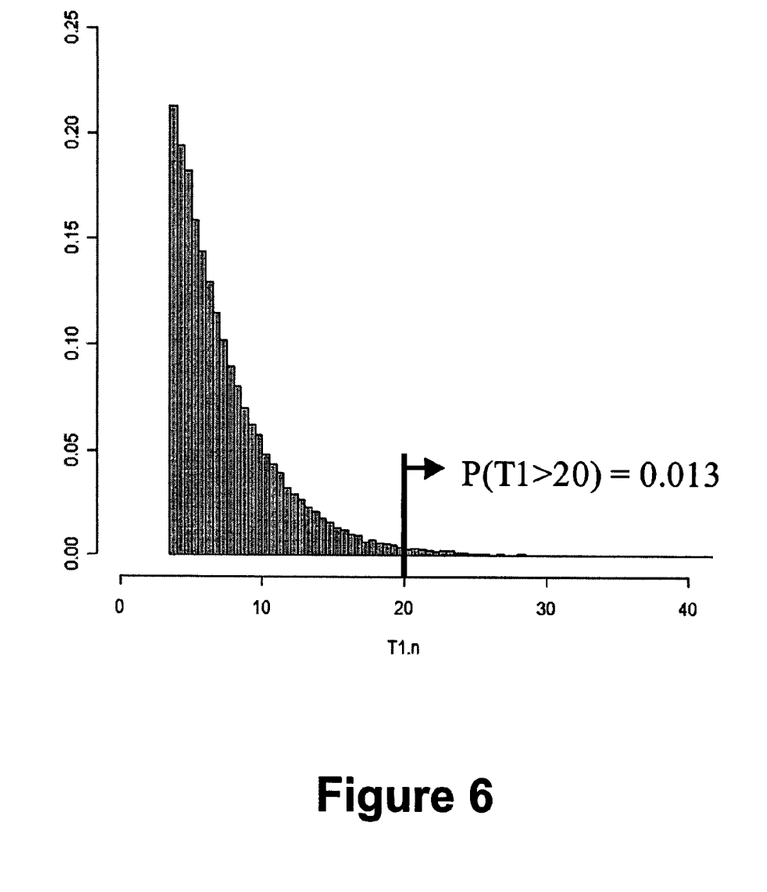
FIG. 6 is a chart showing results of a method according to various embodiments.

Conditional distributions generated according to embodiments of the present methods may be superior to distributions generated by the financial model alone. For example, FIG. 5 shows the non-conditional default distribution of $T_1$ given the present assumptions, without considering any data beyond time zero, that is, $f(T_1|T_1, T_2, T_3)$. Note that the non-conditional default distribution predicts that $P(T_1<20|T_1, T_2, T_3)=0.036$. FIG. 6, on the other hand, shows the conditional distribution $T_1$ according to embodiments of the present methods. The conditional distribution of FIG. 6 considers data beyond time zero as discussed above. FIG. 6 shows that considering the conditional distribution $P(T_1<20|T_1<3.5, T_2<3.5, T_3=2)=0.013$. Note that this value is different than the one predicted by the non-default distribution by nearly a factor of three.

The benefits of the present methods, systems and computer-readable media are readily apparent to those skilled in the art. The various embodiments described herein may provide graphical representations of financial models including, for example, credit models. Through application of various aspects of the embodiments described herein, financial models may be analyzed, and conditional probabilities may be easily calculated.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

The various portions and components of various embodiments of the present invention can be implemented in computer software code using, for example, Visual Basic, C, or C++ computer languages using, for example, object-oriented techniques.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A computer-assisted method for evaluating a financial credit model, the method comprising:

receiving, by a computer device, data describing a financial model, wherein the financial model is a credit model describing a distribution of a first financial variable representing a default probability of a credit instrument, and wherein the computer device comprises a processor and operatively associated memory;

processing, by a computer device, the data describing the financial model to represent the financial model in a Bayesian network, wherein the processing comprises:

assigning a first financial variable of the financial model to a first node of the Bayesian network, wherein the first financial variable is a random variable associated with a probability distribution that expresses the first financial variable in terms of at least a third financial variable, and wherein the first financial variable represents at least one quantity selected from the group consisting of a default probability of a first credit instrument and a time-to-default of the first credit instrument;

assigning a second financial variable of the financial model to a second node of the Bayesian network, wherein the second financial variable is a random variable associated with a probability distribution that expresses the second financial variable in terms of the third financial variable, and wherein the second financial variable represents at least one quantity selected from the group consisting of a default probability of a second credit instrument and a time-to-default of the second credit instrument;

assigning the third financial variable of the financial model to a third node of the Bayesian network, wherein the third financial variable is a random variable associated with a probability distribution, wherein the third financial variable is a latent factor variable, wherein the third node is a parent node of the first node and the second node, and the third node enables expression of the first financial variable and the second financial variable as conditionally independent;

setting, by the computer device, an evidence value for at least the second financial variable, wherein the evidence value represents at least one quantity selected from the group consisting of equality data and inequality data corresponding to the probability distribution associated with the second financial variable, and in response, inferring a conditional probability distribution function of at least the first financial variable.

2. The method of claim 1, wherein the financial model is a copula model for describing the default probability of one or more credit instruments.

3. The method of claim 1, wherein the inferring comprises recalculating, by the computer device, an equation representing the third financial variable associated with the third node considering the set evidence value.

4. The method of claim 3, wherein the inferring comprises recalculating, by the computer device, an equation representing the first financial variable associated with the first node.

5. The method of claim 1, further comprising determining, by the computer device, a graphical representation of dependencies between the first, second and third financial variables.

6. The method of claim 1, further comprising finding, by the computer, a value of a financial instrument based at least in part on the representation of the financial model in the Bayesian network, wherein a property of the financial instrument is described by the first financial variable.

* * * * *